(12) United States Patent
Graham et al.

(10) Patent No.: US 12,415,486 B2
(45) Date of Patent: Sep. 16, 2025

(54) CART STABILITY SYSTEM

(71) Applicant: DEERE & COMPANY, Moline, IL (US)

(72) Inventors: William Douglas Graham, East Moline, IL (US); Mandar M. Kale, Pune (IN)

(73) Assignee: Deere & Company, Moline, IL (US)

( * ) Notice: Subject to any disclaimer, the term of this patent is extended or adjusted under 35 U.S.C. 154(b) by 843 days.

(21) Appl. No.: 16/914,592

(22) Filed: Jun. 29, 2020

(65) Prior Publication Data

US 2021/0129808 A1    May 6, 2021

Related U.S. Application Data

(60) Provisional application No. 62/928,505, filed on Oct. 31, 2019.

(51) Int. Cl.
*B60T 8/17* (2006.01)
*A01B 61/02* (2006.01)
(Continued)

(52) U.S. Cl.
CPC ............ *B60T 8/1701* (2013.01); *A01B 61/02* (2013.01); *A01B 76/00* (2013.01); *B60Q 9/00* (2013.01); *B60T 7/20* (2013.01); *B60T 8/171* (2013.01); *B60T 8/172* (2013.01); *B60T 8/1755* (2013.01); *B60T 8/3205* (2013.01); *G01C 19/00* (2013.01); *G01G 19/08* (2013.01); *G01L 1/22* (2013.01); *G01L 5/0038* (2013.01); *G01P 15/00* (2013.01); *G01S 19/01* (2013.01); *A01C 7/081* (2013.01); *B60T 2210/20* (2013.01);
(Continued)

(58) Field of Classification Search
CPC .......... B60T 7/20; B60T 8/1701; B60T 8/171; B60T 8/172; B60T 8/1708; B60T 8/3205; B60T 13/08; G01L 5/0038
USPC .................................................. 303/123, 124
See application file for complete search history.

(56) References Cited

U.S. PATENT DOCUMENTS 4,284,936 A * 8/1981 Bailey ....................... H02P 3/08
                                                                318/381
6,668,225 B2 * 12/2003 Oh ......................... B60T 8/246
                                                                701/48

(Continued)

OTHER PUBLICATIONS

YouTube video titled "Using the C850 Hydraulic Trailer Brakes"; dated Mar. 9, 2017; screen shot 1 page.

*Primary Examiner* — Logan M Kraft
*Assistant Examiner* — Johnny H Hoang
(74) *Attorney, Agent, or Firm* — Taft Stettinius & Hollister LLP; Stephen F. Rost (57) ABSTRACT

An agricultural train assembly having a tractor and at least one implement coupled to the tractor through a tongue. The assembly has a tractor braking system that selectively applies tractor brakes, an implement braking system that selectively applies implement brakes, a controller that selectively applies the implement braking system, a sensor that communicates with the controller to identify a push force applied to the tongue, the push force being the amount of force applied by the at least one implement towards the (Continued)

tractor. Wherein, the controller communicates with the sensor to identify the push force and compares the push force to a push threshold and when the push force is greater than the push threshold, the controller instructs the implement braking system to apply a burst braking procedure.

19 Claims, 6 Drawing Sheets

(51) Int. Cl.
    *A01B 76/00* (2006.01)
    *B60Q 9/00* (2006.01)
    *B60T 7/20* (2006.01)
    *B60T 8/171* (2006.01)
    *B60T 8/172* (2006.01)
    *B60T 8/1755* (2006.01)
    *B60T 8/32* (2006.01)
    *G01C 19/00* (2013.01)
    *G01G 19/08* (2006.01)
    *G01L 1/22* (2006.01)
    *G01L 5/00* (2006.01)
    *G01P 15/00* (2006.01)
    *G01S 19/01* (2010.01)
    *A01C 7/08* (2006.01)

(52) U.S. Cl.
    CPC ....... *B60T 2210/36* (2013.01); *B60T 2250/00* (2013.01); *B60T 2250/02* (2013.01); *B60T 2270/30* (2013.01)

(56) References Cited

U.S. PATENT DOCUMENTS

| | | | |
|---|---|---|---|
| 10,300,898 B2 | 5/2019 | Kale et al. | |
| 2004/0015312 A1* | 1/2004 | Asano | B60C 23/062 73/146 |
| 2005/0006952 A1* | 1/2005 | Kohler | B60D 1/065 188/1.11 R |
| 2006/0158025 A1* | 7/2006 | Christensen | B60T 7/20 303/7 |
| 2010/0211278 A1* | 8/2010 | Craig | B60T 8/1755 701/70 |
| 2014/0200786 A1* | 7/2014 | Morselli | B60T 8/1887 701/70 |
| 2014/0343813 A1* | 11/2014 | Morselli | B60T 13/686 180/14.1 |
| 2015/0081184 A1* | 3/2015 | Braunberger | B60T 7/20 701/70 |
| 2016/0311280 A1* | 10/2016 | Gerbrandt | B60T 13/08 |
| 2017/0151845 A1* | 6/2017 | Allcorn | B60T 8/1708 |
| 2018/0154874 A1* | 6/2018 | Kulkarni | H01M 8/1004 |
| 2018/0206395 A1* | 7/2018 | Kale | B60T 7/20 |
| 2018/0244247 A1* | 8/2018 | Carlsson | B60T 8/245 |
| 2019/0084534 A1* | 3/2019 | Kasper | B60R 16/0315 |
| 2019/0084537 A1* | 3/2019 | Kasper | B60T 8/17551 |
| 2019/0202423 A1* | 7/2019 | Bongaerts | B60T 8/1837 |
| 2019/0293506 A1* | 9/2019 | Brütt | G01L 5/1627 |
| 2020/0238960 A1* | 7/2020 | Thompson | A01B 59/002 |
| 2021/0053538 A1* | 2/2021 | Pierfelice | B60T 8/172 |
| 2021/0086732 A1* | 3/2021 | Kim | B60W 30/165 |

* cited by examiner

CART STABILITY SYSTEM

CROSS-REFERENCE TO RELATED APPLICATION

The present application claims the benefit of U.S. Provisional Application No. 62/928,505 filed on Oct. 31, 2019, the contents of which are hereby incorporated herein in entirety.

FIELD OF THE DISCLOSURE

The present disclosure relates generally to a cart stability system, and more specifically to a cart stability system that identifies surrounding conditions to predict reduced stability situations.

BACKGROUND

Modern agricultural assemblies often involve a tow vehicle that pulls carts and trailers. The carts and trailers are often equipped with a brake assembly that can be applied independently of the brakes of the tow vehicle. The towed carts and trailers affect the stability of the tow vehicle and can cause reduced stability under certain conditions. Typical agricultural assemblies rely on the operator to understand the conditions within which the agricultural assembly is operating. For example, the operator is required to understand the weight of the towed carts and trailers in order to identify stable running conditions. Often, the towed carts or trailers contain material that is being deposited on the underlying ground. Accordingly, the conditions that affect the stability of the tow vehicle may be ever changing and difficult for the operator to accurately predict.

SUMMARY

One embodiment is an agricultural train assembly having a tractor and at least one implement coupled to the tractor through a tongue. The agricultural train assembly has a tractor braking system that selectively applies tractor brakes, an implement braking system that selectively applies implement brakes, a controller that selectively applies the implement braking system, a sensor that communicates with the controller to identify a push force applied to the tongue, the push force being the amount of force applied by the at least one implement towards the tractor. Wherein, the controller communicates with the sensor to identify the push force and compares the push force to a push threshold and when the push force is greater than the push threshold, the controller instructs the implement braking system to apply a burst braking procedure.

In one example of this embodiment, the sensor is a strain gauge on the tongue and the push force is determined by monitoring the strain gauge values with the controller. In another example, the sensor is at least one of an accelerometer, gyroscope, and a load sensor and the controller calculates the push force based on the values of the sensor.

Another embodiment is an agricultural assembly having a tractor and at least one implement. The agricultural assembly has a sensor assembly identifying a condition of the at least one implement, a controller in communication with the sensor assembly to identify a push force exerted on the tractor based on the condition, and a braking system on the at least one implement. Wherein, the controller implements a braking procedure when the push force is greater than a push force threshold.

In one example of this embodiment, the tractor has a tractor brake assembly and the braking procedure does not engage the tractor brake. In another example, the braking procedure includes identifying a current brake capacity of the braking system wherein if the current brake capacity is above a brake capacity threshold the braking procedure is ended. In yet another example, the sensor assembly has a load cell and the condition is a load applied to a tongue of the agricultural assembly. In another example, the sensor assembly has an accelerometer and the condition is a change in acceleration of the implement. In yet another example of this embodiment, the sensor assembly has a gyroscope and the condition is the orientation of the at least one implement. In another example, the push force is determined by the controller based on a weight and orientation of the implement.

In yet another example of this embodiment, the braking procedure selectively provides a variable braking force to the at least one implement and the controller alters the variable braking force based on the severity of the push force. In one aspect of this example, the controller selectively alters a burst frequency of the braking system to alter the variable braking force.

Another example of this embodiment has a user interface that sends an alert when the braking procedure is being implemented. In another example, an input is selectable to identify when the braking procedure is authorized, wherein if the braking procedure has not been authorized through the input the braking procedure is ended. One aspect of this example has a user interface in the tractor that provides the input to a user to selectively authorize the braking procedure.

In yet another example, the sensor assembly includes a Global Positioning System (GPS) and the condition is topographical information based on the position identified by the GPS. In one aspect of this example, the sensor assembly contains a load sensor that identifies the weight of the at least one implement and the push force is calculated based on the orientation and weight of the at least one implement.

Another embodiment is a method for stabilizing an agricultural train assembly having a tractor pulling at least one implement. The method includes providing a controller in communication with at least one sensor and a user interface, predicting, with the controller through the at least one sensor, when the agricultural train will be in an unstable condition based on current values of the at least one sensor, and automatically implementing a response with the controller when the agricultural train is approaching an unstable condition. Wherein, the response provides a corrective action to avoid the unstable condition.

In one example of this embodiment the at least one sensor identifies a push force of the at least one implement towards the tractor and the response includes selectively pulsing a braking system of only the at least one implement.

In another example of this embodiment, the at least one sensor provides global positioning data and speed data to the controller and the predicting step includes identifying when the agricultural train will be positioned along a hill, wherein the corrective action includes one or more of displaying a warning of the upcoming condition on the user interface and automatically applying a brake force with a braking system.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
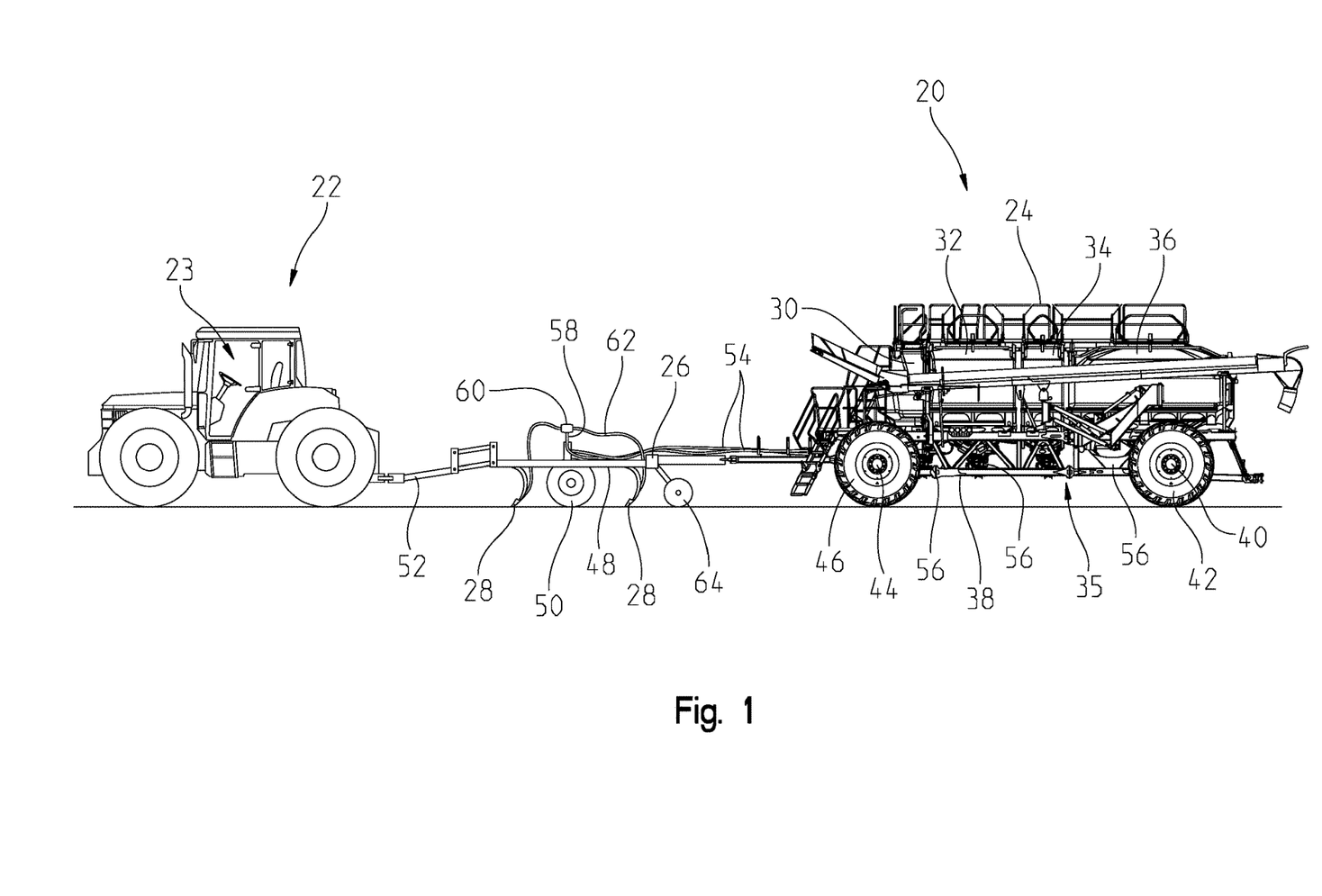
FIG. 1 is a side view of a towed cart and prime mover along with an attached implement.

An air or pneumatic seeder 20 is shown in FIG. 1 towed by a tractor or prime mover 22. The seeder 20 includes an air cart 24, also known as a commodity cart, having one or more tanks for one or more commodities to be applied to the soil, and a drill or implement 26 which applies the commodity to the soil. The drill has a plurality of ground engaging tools 28. The cart 24 is shown with four tanks 30, 32, 34, and 36 mounted on a frame 38. The frame 38 is supported on a rear axle 40 having wheels/tires 42 at the rear of the frame 38. Depending on the cart configuration, additional axles may be provided, such as front axle 44 and wheels/tires 46. The axles and wheels support the cart frame 38 for movement over the ground surface towed by tractor 22. Any number of tanks can be provided on the air cart. The term "cart" should be broadly construed to include any device towed by a prime mover that is supported on one or more axles, such as a trailer, wagon, cart, implement, etc.

The drill 26 includes a frame 48 supported by ground wheels 50 and is connected to the rear of the tractor 22 by a tongue 52. As shown, the cart 24 is known as a "tow behind" cart meaning that the cart follows the drill. In alternative arrangements, the cart may be a "tow between" cart meaning that the cart is between the tractor 22 and drill 26. In yet a further possible arrangement, the air cart and drill can be combined onto a common frame. The tanks 30, 32, 34, and 36 can be any suitable device for holding a material or commodity such as seed or fertilizer to be distributed to the soil. The tanks could be hoppers, bins, boxes, containers, etc. The term "tank" shall be broadly construed herein. Furthermore, one tank with multiple compartments can also be provided.

A pneumatic distribution system 35 includes a fan located behind the front tires 46, connected to a product delivery conduit structure having multiple product flow passages 54. The fan directs air through the passages 54. A product meter assembly 56 is located at the bottom of each tank and delivers product from the tanks at a controlled rate to the passages 54 and the air stream moving through the passages 54.

Each passage 54 carries product in the air stream to a secondary distribution tower 58 on the drill 26. Typically, there will be one tower 58 for each passage 54. Each tower 58 includes a secondary distributing manifold 60 located at the top of a vertical tube. The distributing manifold 60 divides the flow of product into a number of secondary distribution lines 62. Each secondary distribution line 62 delivers product to one of a plurality of ground engaging tools 28 which opens a furrow in the soil and deposits the product therein. The number of passages 54 may vary from one to eight or ten or more, depending on the configuration of the cart and drill. Depending on the cart and drill, there may be two distribution manifolds in the air stream between the meters and the ground engaging tools. Alternatively, in some configurations, the product is metered directly from the tank into secondary distribution lines 62 leading to the ground engaging tools 28 without an intermediate distribution manifold.

A firming or closing wheel 64 associated with each tool 28 trails the tool and firms the soil over the product deposited in the soil. Various types of tools 28 may be used including, tines, shanks, disks, etc. The tools 28 are movable between a lowered position engaging the ground and a raised position above the ground. Each tool may be configured to be raised by a separate actuator. Alternatively, multiple tools 28 may be mounted to a common rockshaft for movement together. In yet another alternative, the tools 28 may be fixed to the frame 38 and the frame 38 raised and lowered by linkages on each of the drill wheels 50.

Figure 2:
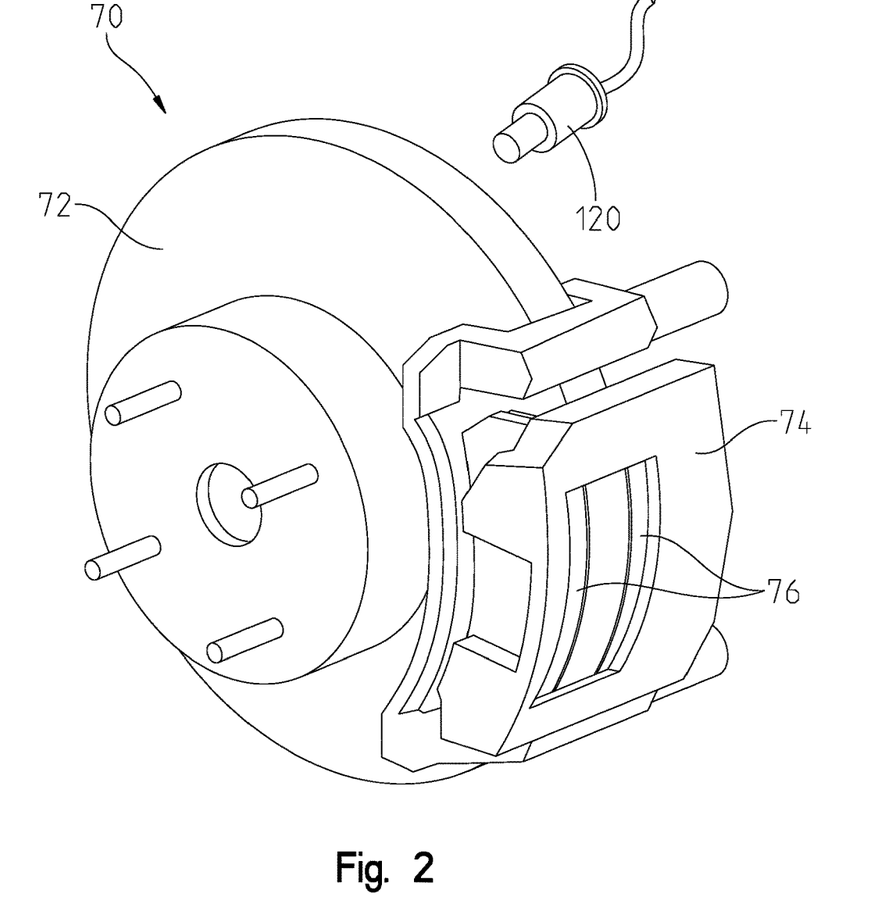
FIG. 2 is a perspective view of a brake assembly on an axle of the cart of FIG. 1.

Rear axle 40 of the cart is provided with a friction brake assembly 70 including a brake rotor 72 and caliper assembly 74 with brake pads 76 shown in FIG. 2. Other brake types may be used such as a drum and brake shoes, etc. The brake assembly may be applied upon actuation of the brakes on tractor 22. However, there are situations when the brake assembly on the cart should be applied while not braking the tractor. One such situation is when traveling downhill in the field and approaching the end of the row. At the end of the row, the tools 28 are lifted from the ground for turning of the seeder for the next pass. The tools generate a significant draft load when they are in the soil. This load also resists the pull of gravity on the cart when traveling downhill. When the tools are raised for the turn, however, this resistance from the draft load is eliminated, allowing the cart to push on the drill and tractor in a tow behind configuration, or allowing the cart to push on the tractor in a tow between configuration. To prevent this pushing, a brake control system 80 may enable short duration actuation of the brake assembly in what is referred to as "burst application" of the brake assembly independent of the tractor brakes.

Figure 3:
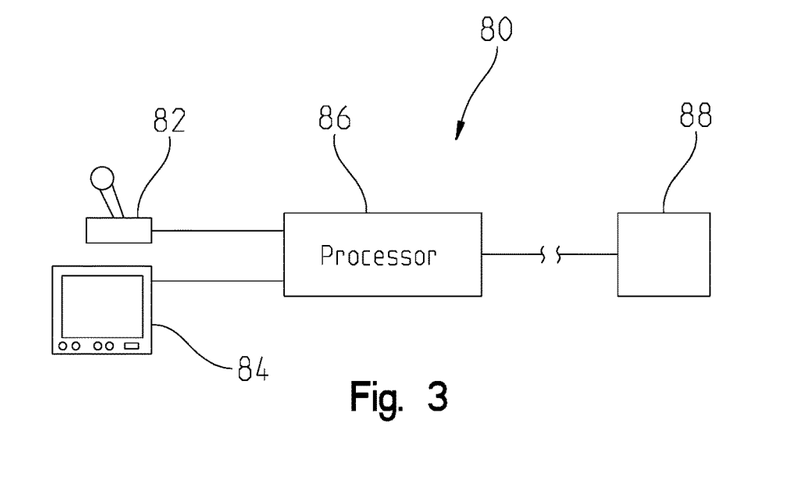
FIG. 3 is a schematic diagram of a brake control system.

In one embodiment, the brake control system 80 includes an input device 82, a display 84, and a programmable processor 86. The input device 82 is shown in FIG. 3 as a mechanical push button. Other mechanical devices may be used such as a switch, button, actuator, knob, lever, pedal, etc. Alternatively, the display may be a touch screen such that an appropriate symbol on the display represents a button to be pressed as the input device. The programmable processor 86 is connected to the display and input device and may be packaged with the display in a common case. The display and the input device, if separate from the display, may both be mounted in the operator station 23 of the tractor 22.

When the input device 82 is activated, the control system 80 may enable an automatic burst application of the cart brake assembly (see box 704). The processor 86 may be programmed such that the burst application is based on the measured conditions of the system. In this scenario, the controller 88 may implement a burst application of the brake assembly 70 while the measured conditions are present as discussed in further detail herein.

As with any friction brake system, application of the brake assembly generates heat in the brake components, such as the rotor 72. If excessive heat is generated, the rotor and brake pads may be damaged, reducing the braking ability of the brake assembly. Such overheating may occur if the cart brake assembly is continuously applied while the seeder is being pulled through the field by the tractor 22. In one aspect of this disclosure, the burst application of the brake assembly avoids continuous application of the brake assembly while the seeder is being pulled through the field thereby reducing excessive heat generation among other things.

In one aspect of this disclosure, the control system 80 is programmed to only allow burst braking when the temperature of a component of the brake assembly is below a certain level. Furthermore, the display 84 indicates to the operator the current capacity of the brake assembly for burst application of the brake assembly. The brake burst application current capacity may be calculated and stored in a memory unit of the processor 86 or elsewhere to identify the controller 88 the available braking capacity of the brake assembly 70. Similarly, the display 84 may indicate to the user the available braking capacity identified by the controller 88.

Figure 4A:
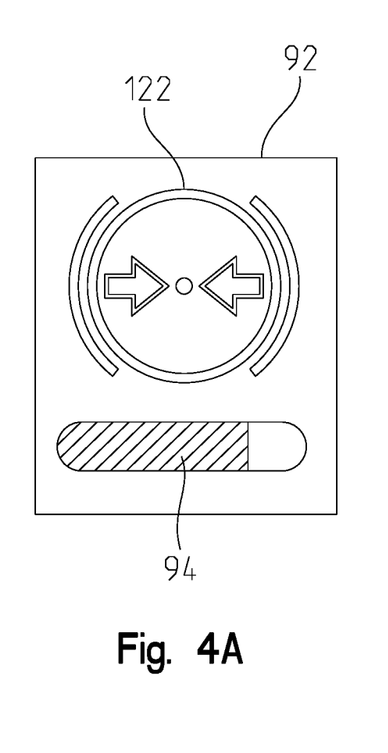
FIGS. 4A, 4B, and 5 are plan views of additional icons for displaying indicating information about the brake assembly.
Figure 4B:
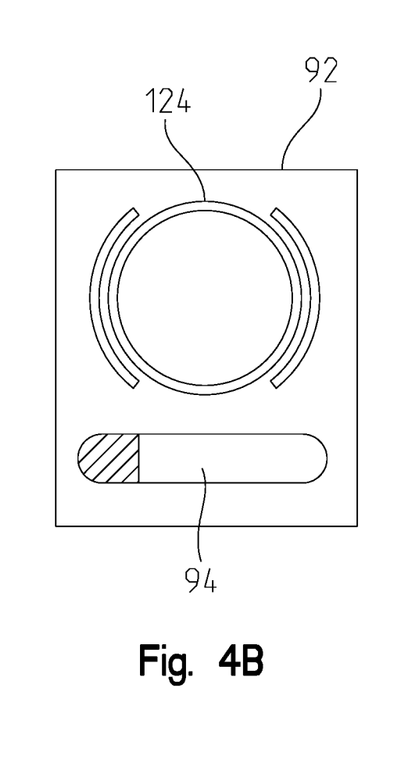
Figure 5:
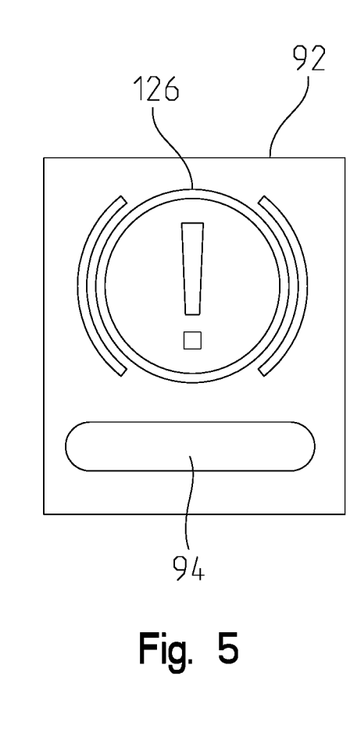

Along with identifying the brake capacity, the display 84 can also indicate the current status of the brake system. With reference to FIG. 4A, the icon 92 shows the brake assembly as currently being applied with a symbol 122 along with the capacity bar 94. FIG. 4B shows the brake assembly not being applied with the symbol 124 along with the capacity bar 94. A red brake symbol 126 in FIG. 5 indicates a brake failure or fault. This may occur due to a brake malfunction, such as loss of fluid pressure, electrical disconnection between the processor and a hydraulic controller 88, etc., requiring immediate attention. A loss of fluid pressure may be detected by the hydraulic controller 88 and a signal sent to the brake control system 80.

The processor 86 determines the capacity for burst application of the brake assembly based on the temperature of a brake component, such as the rotor 72. As shown in FIG. 2, a non-contact infra-red temperature sensor 120 is shown as part of the brake control system 80 and is coupled to the processor 86. The sensor 120 is positioned and oriented to measure the temperature of the rotor 72. The temperature of other brake components can be measured if desired such as the caliper assembly 74 or the brake pads 76. Other temperature sensors may be used including a contact thermocouple. The sensor may be connected by a CAN bus or analog or may be wired to the brake control system 80 or connected wirelessly.

The temperature may be estimated, as opposed to measured, to eliminate the need for the sensor 120 and associated wiring harness. Temperature of the brake rotor may be estimated based on the brake load and the duration and timing of burst brake application as follows, where the brake power is the brake load.

The brake power as a function of time, P(t), is equal to braking force times speed. This is represented by the equation:

$$P(t) = n * .mu. * BP(t) * A * r/R * V(t)$$

Where:
  n=number of brake pads;
  .mu.=friction coefficient between brake pad and rotor;
  BP(t)=brake pressure as a function of time;
  A=caliper piston area;
  r=radius from the center axis to brake pads;
  R=tire radius; and
  V(t)=speed as a function of time.

This is the energy that is going into the brake rotor per second. This can easily be estimated if the friction coefficient is assumed to be constant within the temperature range in which the brake assembly is operated.

The change in temperature of the rotor upon application of the brake assembly is determined by the following equation:

$$.DELTA.T/s = P(t)/(mc)$$

Where:
  .DELTA.T/s=temperature increase per second;
  P(t)=brake power as a function of time;
  m=mass of the rotor (only the mass where the pads rub); and
  c=specific heat.

The change in temperature is added to the ambient temperature to achieve a rotor temperature. During times when the brake is not applied, the rotor will undergo cooling. This is a function of the rotor surface area, the surface condition, and material properties. Newton's laws of thermodynamics allow for prediction of a cooling curve. The temperature increase during brake application together with the cooling between brake applications allows the processor to calculate an estimated brake rotor temperature. The maximum brake temperature at which burst braking capacity remains is substantially lower than the temperature at which the brake components are susceptible to damage. This allows for cart brake application upon actuation of the tractor brakes to slow or stop the entire machine, i.e., the prime mover, the cart, and any implement, regardless of the ability for burst brake application. Burst brake application is for application of the cart brake assembly only, while the entire machine is being propelled by the prime mover. When the prime mover brakes are being applied, it is to slow or stop the entire machine. Once the machine is stopped, there will be no additional heating of the brake assembly. The limits on burst application of the cart brake assembly, without application of the prime mover brakes, is to limit the temperature of the brake assembly. If allowed to apply the cart brake assembly continuously, while towing the cart, the brake temperature would continue to rise without limit, causing overheating of the brake assembly.

Figure 6:
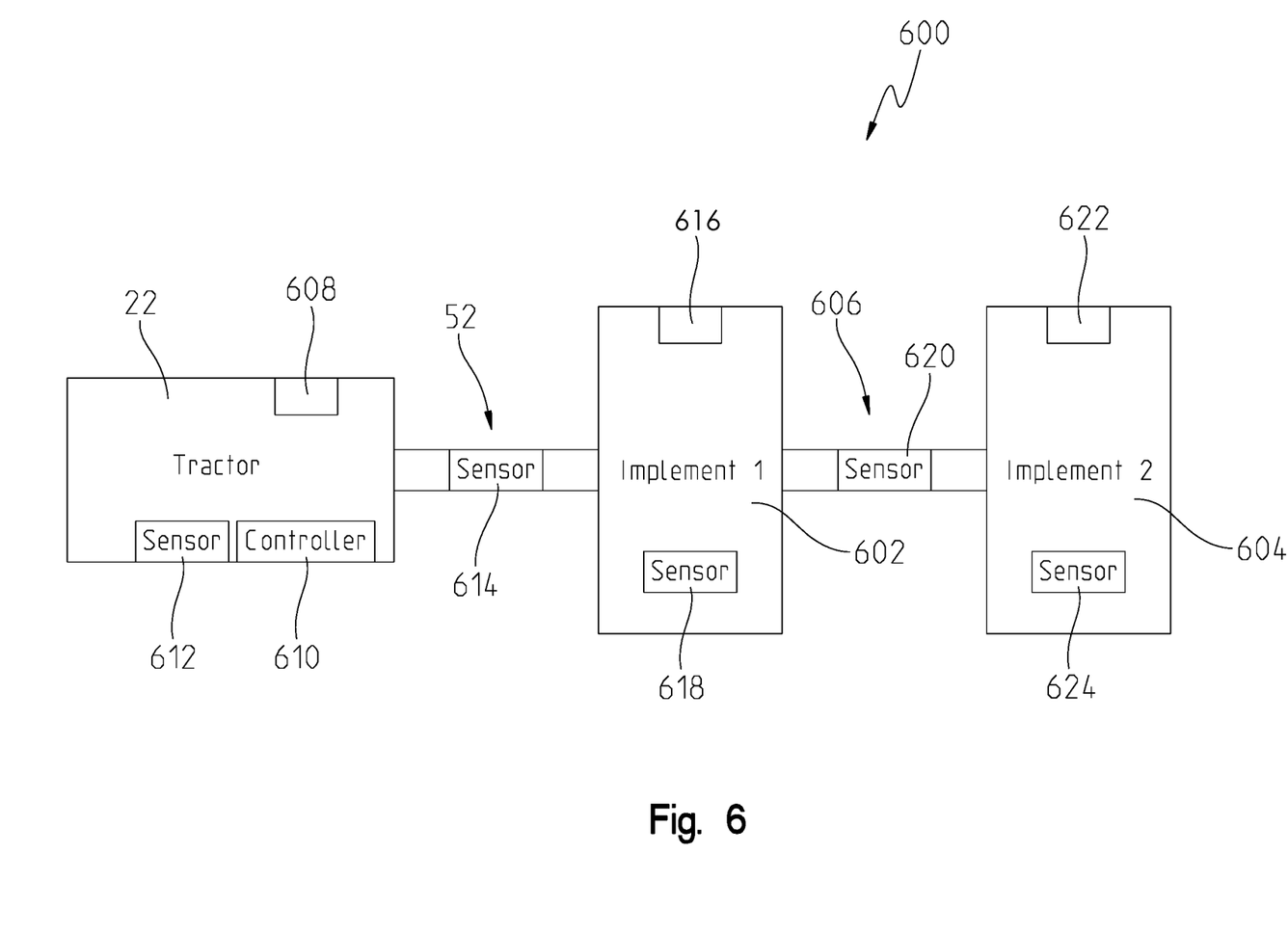
FIG. 6 is a schematic view of a vehicle assembly.

Referring now to FIG. 6, one exemplary embodiment of a vehicle assembly 600 is illustrated. The vehicle assembly 600 may have the tractor 22 coupled to a first implement 602 with the tongue 52 as discussed herein. In one aspect of this disclosure the first implement 602 may be the drill 26 discussed herein with reference to FIG. 1. Alternatively, the first implement 602 may be the air seeder 20 in certain configurations. Similarly, a second implement 604 may be further coupled to the first implement 602 through a second tongue 606. The second implement may the air seeder 20 discussed with reference to FIG. 1. Alternatively, the second implement may be the drill 26. Regardless, the second tongue 606 may pivotally couple the second implement 604 to the first implement 602 to allow the second implement 604 to be towed behind the first implement 602.

While only two implements 602, 604 are discussed herein, this disclosure contemplated embodiments using less than two implements as well. More specifically, in one embodiment there may be only a single implement towed behind the tractor 22. Further still, in other embodiments there may be more than two implements pivotally coupled to one another and towed behind the tractor 22. Accordingly, this disclosure contemplates applying the teachings discussed herein to tractor assemblies having any number of implements coupled thereto.

The tractor 22 may have a braking system 608 that engages ground engaging mechanisms of the tractor 22 to apply a braking force thereto. The braking system 608 may be a hydraulic or pneumatic system that engages a portion of the driveline of the ground engaging mechanisms to slow the tractor 22 as desired by a user. The braking system 608 may be directly applied via a master and slave hydraulic configuration or be part of an electro-hydraulic or electro-pneumatic system. In one aspect of this disclosure, the braking system 608 is an electro-hydraulic system that is in communication with a controller 610 to selectively apply the braking force to the tractor 22 responsive to a user input such as depressing a brake pedal.

The controller 610 may be the hydraulic controller 88 of the brake control system 80 discussed herein with reference to FIG. 3. Alternatively, the controller 610 may be one or more controllers of the tractor 22. Further, the controller 610 may have a processor and have access to a memory unit that allows the controller 610 to read and write data and store executable functions and variables among other things. Regardless of the location of the controller 610, the controller 610 may selectively engage the braking system 608 of the tractor 22 to apply a braking force thereto as desired by a user.

The tractor 22 may have one or more sensor assembly 612 thereon. The sensor assembly 612 may have one or more of a speed sensor, Global Positioning System (hereinafter "GPS"), accelerometer, gyroscope, or the like. The sensor assembly 612 may be in communication with the controller 610 to identify value readings of the sensor assembly 612 to be processed or stored by the controller 610. While controller 610 is referred to herein, other embodiments utilize a separate controller for communicating with the sensor assembly 612. Accordingly, while FIG. 6 illustrates only one controller 610, this disclosure contemplates separate controllers for communicating with the sensor assembly 612 and instructing the braking system 608 as well. Further still, in embodiments utilizing multiple different sensors, each type of sensor may communicate with a separate controller.

In another aspect of this disclosure, the tongue 52 or other portion of the first implement 602 may have a sensor 614 coupled thereto. In one example, the sensor 614 is a strain gauge coupled to the tongue 52. In this configuration, the sensor 614 can identify the strain experienced by the tongue 52. More specifically, the sensor 614 may communicate a signal indicative of a compressive force between the first implement 602 and the tractor 22 when the tractor 22 is applying a braking force with the braking system 608. Alternatively, the sensor 614 may identify a compressive force between the first implement 602 and the tractor 22 when the assembly 600 is travelling down a grade.

Alternatively, the sensor 614 may identify when the tongue 52 is under tension as the first implement 602 is being pulled by the tractor 22. The sensor 614 may identify a tension along the tongue 52 when the assembly 600 is travelling up a hill, tools of the implement 602 are engaging the soil, or when the tractor 22 is accelerating. In other words, the sensor 614 may identify whether the tractor 22 is pulling the implement 602 or being pushed by the implement 602.

While the sensor 614 is illustrated and discussed as being coupled to the tongue 52, this disclosure contemplates coupling the sensor 614 to any portion of the first implement 602 that may experience compressive loads between the first implement 602 and the tractor 22. More specifically, in one aspect of this disclosure the sensor 614 may be coupled to a frame of the first implement 602. Alternatively, the sensor 614 may be coupled to a bracket or the like that couples the tongue 52 to the frame of the implement 602.

In another aspect of this disclosure, the implement 602 may have a brake system 616. The brake system 616 may be an electro-hydraulic, electro-pneumatic, or the like brake system that selectively engages brakes of the first implement 602. The braking system 616 may have braking assemblies on one or more of the ground engaging mechanisms of the first implement 602. More specifically, the braking system 616 may implement one or more of the friction brake assembly 70 discussed herein with reference to FIG. 2. The brake system 616 may be selectively controlled by a controller to apply a braking force to the first implement 602 such as the brake control system 80. In one non-exclusive example, the controller 610 may selectively initiate a braking procedure with the braking system 616 of the first implement 602.

In another aspect of this disclosure, the first implement 602 may have a sensor assembly 618 containing one or more sensor. In one embodiment, sensor assembly 618 includes a gyroscopic sensor that identifies the orientation of the first implement 602. In another embodiment, the sensor assembly 618 may include a load sensor that identifies the weight of any loads on the first implement 602. In yet another embodiment, the sensor assembly 618 is a position sensor that identifies the position of tools coupled to the first implement 602. The position sensor may identify when any tools of the first implement 602 are engaging the underlying soil and when the tools are in a raised orientation.

The sensor assembly 618 may be any one or more of the sensors discussed herein and communicate sensor values to a controller such as controller 610. Further still, in one non-exclusive example the sensor assembly 618 may communicate values to the controller 610 that affect the engagement of the braking system 616. More specifically, if the sensor assembly 618 is a gyroscopic sensor it may indicate when the first implement 602 is in a downhill orientation wherein the first implement 602 is pushing the tractor 22. In this scenario, the controller may selectively engage the braking system 616 to ensure the first implement 602 does not push the tractor 22 with sufficient force to cause an unstable condition. Further still, the sensor assembly 618 may identify the orientation of the tool assembly to alter the brake procedure of the braking system 616. More specifically, as the tools are raised from the underlying ground, the drag force of the first implement 602 is reduced. Accordingly, the controller may apply a more aggressive braking force with the braking system 616 when the sensor assembly 618 indicates the tools are raised compared to lowered to account for the reduced drag force.

Similar to the first implement 602, the second tongue 606 or other portion of the second implement 604 may have a sensor 620 coupled thereto. In one example, the sensor 620 is a strain gauge coupled to the second tongue 606. In this configuration, the sensor 620 can identify the strain experienced by the second tongue 606. More specifically, the sensor 620 may communicate a signal indicative of a compressive force between the second implement 604 and the first implement 602 when the tractor 22 is applying a braking force with the braking system 608. Further, the sensor 620 may identify a compressive force between the second implement 604 and the first implement 602 when the assembly 600 is travelling down a grade.

Alternatively, the sensor 620 may identify when the tongue 606 is under tension as the second implement 604 is being pulled by the first implement 602. The sensor 620 may identify a tension along the tongue 606 when the assembly 600 is travelling up a hill, tools of the second implement 604 are engaging the soil, or when the tractor 22 is accelerating. In other words, the sensor 620 may identify whether the second implement 604 is applying a pulling or pushing force to the assembly 600.

While the sensor 620 is illustrated and discussed as being coupled to the tongue 606, this disclosure contemplates coupling the sensor 620 to any portion of the second implement 604 that may experience compressive loads between the second implement 604 and the first implement 602. More specifically, in one aspect of this disclosure the sensor 620 may be coupled to a frame of the second implement 604. Alternatively, the sensor 620 may be coupled to a bracket or the like that couples the tongue 606 to the frame of the implement 604.

In another aspect of this disclosure, the second implement 604 may also have a brake system 622. The brake system 622 may be an electro-hydraulic, electro-pneumatic, or the like brake system that selectively engages brakes of the second implement 604. The braking system 622 may have braking assemblies on one or more of the ground engaging mechanisms of the second implement 604. More specifically, the braking system 622 may implement one or more of the friction brake assembly 70 discussed herein with reference to FIG. 2. The brake system 622 may be selectively controlled by a controller to apply a braking force to the second implement 604 similarly to the brake control system 80 of FIG. 2. In one non-exclusive example, the controller 610 may selectively initiate a braking procedure with the braking system 622 of the second implement 604.

In another aspect of this disclosure, the second implement 604 may have a sensor assembly 624. In one embodiment, sensor assembly 624 includes a gyroscopic sensor that identifies the orientation of the second implement 604. In another embodiment, the sensor assembly 624 may be a load sensor that identifies the weight of any loads on the second implement 604. More specifically, in one aspect of this disclosure the second implement 604 may be a commodity cart that contains tanks 30, 32, 34, 36 having a commodity such as seed or fertilizer therein. The amount of commodity in the tanks 30, 32, 34, 36 affects the weight of the second implement 604 and thereby affects the forces (stopping, pushing, pulling, etc.) transferred through the first implement 602 to the tractor 22. In yet another embodiment, the sensor assembly 624 includes a position sensor that identifies the position of any tools coupled to the second implement 604. The position sensor may identify when any tools of the second implement 604 are engaging the underlying soil and when the tools are in a raised orientation.

The sensor assembly 624 may include any one or more of the sensors discussed herein and communicate sensor values to one or more controller. Further still, in one non-exclusive example the sensor assembly 624 may communicate values to a controller, such as the controller 610 or 88, that selectively controls the engagement of the braking system 622. More specifically, if the sensor assembly 624 includes a gyroscopic sensor the sensor assembly 624 may indicate when the second implement 604 is in a downhill orientation wherein the second implement 604 is pushing the tractor 22 through the first implement 602. In this scenario, the controller may selectively engage the braking system 622 to ensure the second implement 604 does not push the tractor 22 with sufficient force to cause an unstable condition.

In one non-limiting example, the sensor assembly 624 may identify the loaded weight of the second implement 604 to alter the brake procedure of the braking system 622. More specifically, the controller may utilize load sensors to determine the weight of commodity in the tanks 30, 32, 34, 36 to thereby calculate expected forces acting on the tractor 22. Accordingly, the controller may apply a more aggressive braking force when the sensor assembly 624 identifies a heavily loaded second implement 604 compared to when the sensor assembly 624 identifies a substantially empty second implement 604.

Figure 7:
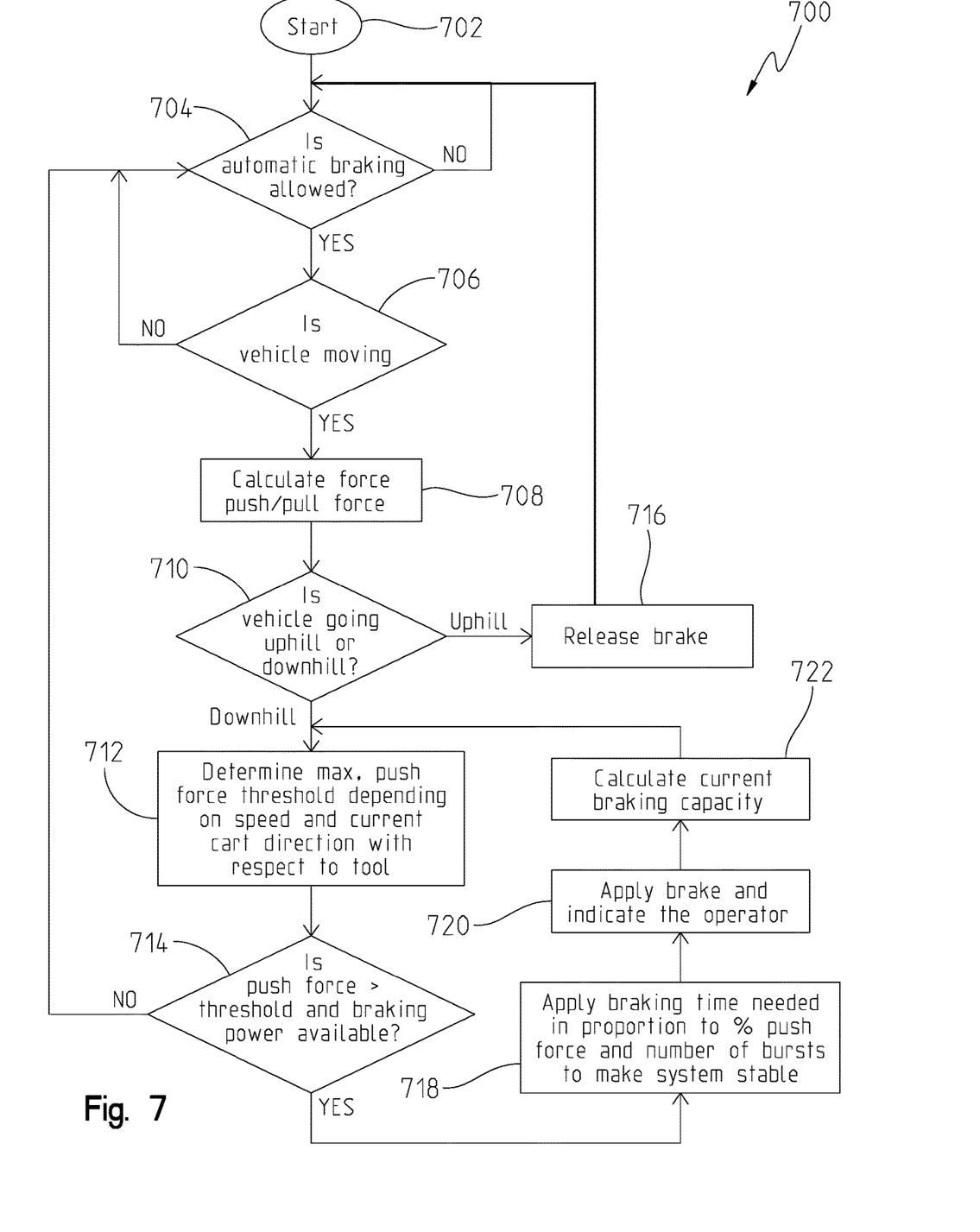
FIG. 7 is a logic flow chart of one embodiment of this disclosure.

Referring now to FIG. 7, one non-exclusive example of a control system 700 is illustrated. The control system 700 may be stored in a memory unit of a controller or controllers such as the controller 610. Alternatively, the control system 700 may be stored on any other controller of the assembly 600 such as the hydraulic controller 88. In one aspect of this disclosure the control system 700 is stored on a remote controller and communicated to the assembly 600 using known wireless communication protocols. Further still, the control system 700 may be executed on a plurality of different controllers instead of being fully executed by just one controller.

The control system 700 may initially start at box 702. Box 702 may be an initial indication that vehicle assembly 600 is in an "on" or moving condition. In one example, the start box 702 may be initiated when the ignition of the tractor 22 is in an "on" position. In this configuration, the controller 610 may identify that the tractor 22 is on and that one or more implement is coupled thereto. In another example, the start box 702 may be engaged via a user interface or switch of the tractor 22. In yet another example, one or more of the sensor assemblies 612, 618, 624 may be an accelerometer or the like and the start box 702 may be initiated when movement of the assembly 600 is detected through the sensors.

In box 704 a check may be performed to identify if the automatic braking functionality of the control system 700 is allowed. If allowed, the control system 700 may execute the remaining boxes. However, if automatic braking is not allowed in box 704, the control system 700 may not execute the automatic braking functionality and continue to monitor box 704.

The control system 700 may identify whether the automatic braking function is allowed in box 704 via any type of user interface. In one non-exclusive example, the input device 82 may be selectable by the user to indicate whether automatic braking is allowed. In another example, a touchscreen user interface may be positioned in the cab of the tractor 22 and have a selectable icon indicating automatic braking is allowed. In yet another embodiment, the automatic braking of box 704 may always be allowed and box 704 may be substantially skipped as part of the control system 700.

If automatic braking is allowed in box 704, the control system may execute box 706 wherein the current vehicle speed is compared to a speed threshold. In box 706, the vehicle speed may be determined through the sensor assembly 612 of the tractor 22 or through a sensor assembly 618, 624 of the implements 602, 604. Alternatively, the vehicle speed may be determined via a GPS signal from the sensor assembly 612. Further still, the control system 700 may refer to other vehicle systems of the tractor 22 to identify the vehicle speed. The current vehicle speed may be the speed at which the assembly 600 is travelling relative to the underlying surface. Accordingly, in one example the speed threshold of box 706 may be about zero miles per hour wherein when the current speed is greater than zero miles per hour the control logic 700 considers box 708. However, if the current vehicle speed is not greater than the speed threshold in box 706 than the control system 700 may execute box 704 and continue to monitor boxes 704, 706.

Box 706 the control system 700 may be utilizing vehicle speed values to determine whether automatic braking should be implemented. More specifically, the control system 700 may utilize box 706 to ensure the assembly 600 is moving before implementing the automatic brake procedure of the remaining boxes. Further, while the speed threshold is discussed herein as being about zero miles per hour, other speed thresholds are considered herein as well. More specifically, the speed threshold may be a speed greater than zero miles per hour. In this example, the speed threshold may be a speed that is slow enough to not require automatic braking. More specifically, the speed threshold may be a speed that is slow enough to not likely cause instability of the assembly 600. Accordingly, many different speed threshold values are contemplated herein.

If the control system 700 identifies that the current speed is greater than the speed threshold in box 706, the control system 700 may calculate or otherwise determine a current force applied to the tractor 22 by the first and second implement 602, 604 in box 708. The force applied to the tractor 22 may be a push force applied to the tractor 22 through the tongue 52. A push force may be experienced when the tractor 22 is travelling down a hill and the trailing implements 602, 604 are pulled by gravity towards the tractor 22 as one example.

Alternatively, the force determination of box 708 may be a pull force experienced by the tractor 22 through the tongue 52. A pull force may occur when the tractor 22 is pulling the implements 602, 604 along a level surface, when one of the implements has a drill component that is being pulled through the underlying surface, and when the tractor 22 is pulling the implements 602, 604 up a hill as a few non-exclusive examples.

The control system 700 may utilize any of the sensors or sensor assemblies 612, 614, 618, 620, 624 discussed herein to identify the force applied to the tractor 22 by the implements 602, 604. In one example, the sensor 614 on the tongue 52 may be a strain gauge that directly measures the strain of the tongue 52 to thereby identify the force applied to the tractor 22. In this configuration, the sensor 614 identifies whether the tongue 52 is experiencing compression or tension to thereby identify whether the implements 602, 604 are pushing or being pulled by the tractor 22. In one aspect of this disclosure, the second tongue 606 may also have a strain gauge as the sensor 620 to further identify how much of the force acting on the tractor 22 is caused by the first implement 602 and how much of the force acting on the tractor 22 is cause by the second implement 604.

Alternatively, the control system 700 may utilize the sensors assemblies 618, 624 of the implements 602, 604 to identify the force acting on the tractor 22 in box 708. More specifically, the sensor assembly 618 of the first implement 602 may have a gyroscopic sensor or the like that is able to identify when the implement 602 is on a downhill or uphill grade. In this configuration, the control system 700 may calculate the push or pull force applied to the tractor 22 by the implement 602 based on the grade on which the assembly 600 is travelling. More specifically, the control system may determine the severity and direction of the grade with the sensor assembly 618. Then, the control system 700 may calculate the expected push or pull force that the first implement 602 applies to the tractor 22 based on known attributes of the first implement 602 such as implement weight or drag resistance along with spacing from the tractor 22.

In this configuration, the sensor assembly 618 may also have a tool orientation sensor that identifies when any tools coupled thereto are engaging the underlying surface. If the tools of the first implement 602 are engaging the underlying surface, the push force of the first implement 602 towards the tractor 22 in a downhill scenario will be lower than when the tools are not engaging the underlying surface. Accordingly, in one embodiment of box 708 the implement orientation and tool engagement are considered when calculating the force applied to the tractor 22 by the first implement 602.

Similarly, the sensor assembly 624 of the second implement 604 may have a gyroscopic sensor that is able to identify when the implement 604 is on a grade. In this configuration, the control system 700 may calculate the push or pull force applied to the tractor 22 by the implement 604 based on the grade on which the assembly 600 is travelling. More specifically, the control system may determine the severity and direction of the grade with the sensor assembly 624. Then, the control system 700 may calculate the expected push or pull force that the second implement 604 applies to the tractor 22 based on known attributes of the second implement 602 such as implement weight or drag resistance along with spacing from the tractor 22.

In this configuration, the sensor assembly 624 may also have a load sensor that identifies the weight of any commodity in the tanks 30, 32, 34, 36. As the weight of the commodity changes as the commodity is dispersed, the control system 700 may measure the weight of the remaining commodity to calculate the force applied to the tractor 22. Accordingly, in one embodiment of box 708 the implement orientation and commodity load weight are considered when calculating the force applied to the tractor 22 by the second implement 604. In the example relying on calculating the expected load of the implements 602, 604 based on orientation, the calculated loads of the first and second implement 602, 604 may be added together to determine the force acting on the tractor 22 in box 708.

In one aspect of this disclosure, control system 700 may have stored therein constants or known values of the assembly 600 that may be utilized in box 708 to calculate the expected force. For example, dimensions identifying the spacing of the implements 602, 604 from the tractor 22 may be stored therein. Further, drag coefficients, weights, and the like may all be values utilized by the control system 700 to calculate the force exerted on the tractor 22 by the implements 602, 604 in box 708.

In another aspect of this disclosure, the control system 700 may utilize any of the sensor assemblies 612, 618, 624 discussed herein to determine whether the assembly is travelling up hill in box 710. In this box, one or more of the sensor assemblies 612, 618, 624 may be a gyroscopic sensor or the like that identifies the orientation of the assembly 600. If the sensor identifies an uphill condition, it may conclude that that automatic braking procedure is not required and execute box 716. Alternatively, if the control system 700 identifies a downhill condition with one or more of the sensor assemblies 612, 618, 624 the control system 700 may execute box 712.

In box 712, the control system 700 may determine a maximum push force threshold. The maximum push force threshold may be the maximum push force that can be experienced by the assembly 600 while remaining substantially stable. Remaining substantially stable may refer to conditions wherein the tractor 22 is not being pushed by the implements 602, 604 (i.e. travelling at speeds greater than desired via the operator inputs). Similarly, remaining substantially stable may refer to ensuring the implements 602, 604 do not jackknife relative to the tractor 22. Further still, remaining substantially stable may refer to ensuring the tractor 22 does not slide or overturn while turning due to excessive push forces caused by the implements 602, 604 while in a turn. The control system 700 may consider any other factor that may be relevant to tractor stability and the examples provided herein are not exhaustive.

In one aspect of this disclosure, the maximum push force threshold of box 712 may be based on the speed of the assembly 600 and the orientation of the implements 602, 604 relative to one another and the tractor 22. More specifically, in box 712, the control system 700 may consider the speed of the tractor 22 in a turn to alter the maximum push force threshold. In one non-exclusive example, the maximum push force threshold determined in box 712 will be lower for a high speed turn compared to a low speed turn of the same radius. In this example, the control system 700 may utilize the sensor assembly 612 to determine whether the tractor 22 is turning. More specifically, the sensor assembly 612 may have an accelerometer that identifies acceleration forces caused when the tractor 22 turns. These acceleration forces may be considered by the control system 700, along with vehicle speed, to determine a variable maximum push force threshold in box 712.

In box 714, the control system 700 may compare the push force of box 708 to the max push force threshold of box 712. If the current push force is less than the maximum push force threshold, the control system 700 may not initiate the automatic braking function. However, if the current push force is greater than the maximum push force threshold, and the corresponding braking systems 616, 622 have braking capacity, the control system 700 may execute box 718.

In one aspect of this disclosure the control system 700 may also identify if there is any braking capacity available in box 714. More specifically, the control system 700 may utilize the brake assembly 70 and control system 80 discussed herein as part of the braking systems 616, 622 of the implements 602, 604 to determine available braking capacity of the respective braking systems 616, 622. If the control system 700 identifies that there is not any available braking capacity (if the components of the braking systems 616, 622 are too hot for example), the control system 700 may execute box 716.

In box 718, the control system may automatically apply one or more of the braking systems 616, 622 of the implements 602, 604 to thereby avoid a potentially unstable condition of the assembly 600. The control system 700 may automatically implement a burst brake procedure in any one or both of the braking systems 616, 622. More specifically, the braking systems 616, 622 may be electro-hydraulic braking systems and the control system 700 may selectively apply the corresponding brakes. Further still, in one aspect of this disclosure the control system 700 may alter the duration and braking force of the braking procedure to accommodate the severity of the push force compared to the threshold. Similarly, the control system 700 may instruct the brake systems 616, 622 to apply the corresponding brakes with a burst frequency that is altered based on the severity of the push force identified in box 708 compared to the determined maximum push force threshold of box 712.

In one aspect of this disclosure, box 718 may provide a brake command having a severity and duration that is determined by comparison of the push force determined in box 708 to the maximum push force threshold of box 712. In one non-exclusive example, if the current force is between 0-5 percent greater than the maximum push force threshold, the brake command may instruct an easy command having an easy severity and short duration. Similarly, if the current force is between 6-20 percent greater than the push force threshold, the brake command may instruct a mild command having a mild severity and mild duration. Further still, if the current force is greater than 20 percent, the brake command may instruct an aggressive command having an aggressive severity and long duration.

The above ranges and examples of altering brake command severity and duration are not exhaustive. This disclosure contemplates using other methods to alter braking severity as well. In one non-exclusive example, the severity and duration of the braking command may be an algorithm that actively calculates the desired braking severity and duration based on the difference of the current force and the maximum push force threshold. Alternatively, the severity and duration of the braking command may be determined with reference to a lookup table stored in a memory unit or the like. Further still, in one embodiment the brake command may be the same any time the current force is greater than the maximum force threshold.

Once the brake command is determined in box 718, the control system 700 may implement the brake command in box 720 by communicating the brake command to the braking system 616, 622 to be applied to the corresponding implement 602, 604. In box 720, the braking systems 616, 622 apply the brake command with the corresponding braking systems 616, 622 to ensure the assembly 600 does not enter an unstable condition. In one non-limiting example, the push force applied by the implements 602, 604 may be approaching a force that could cause a jackknife or overturn condition of the assembly 600. In this situation, box 720 applies the brakes of the braking systems 616, 620 to reduce the push force being applied to the assembly 600 to thereby avoid an unstable condition.

As part of the automatic braking procedure, the control system 700 may also monitor the available braking capacity in box 722. As discussed herein, certain situations may arise wherein the braking systems 616, 622 are applying the corresponding brakes while the assembly 600 continues to move along an underlying surface. One such example is when the assembly 600 is travelling down a hill or the like. In this situation, the braking systems 616, 622 are generating heat as they apply a braking force to the corresponding implement 602, 604. As the heat of the braking systems 616, 622 increases, the available braking force and duration may decrease as a function of the material limitations of the braking systems 616, 622. To avoid overheating and damaging the braking systems 616, 622, the control system 700 may utilize at least the methods discussed herein to determine the available brake capacity based on the brake command implemented in box 720.

In one aspect of this disclosure, box 722 may limit the brake command of box 718 to severities that correspond with available braking capacity. In other words, the control system 700 may alter the burst frequency, duration, and length based on available brake capacity in box 722. In this situation, if the brake command identified in box 718 requires greater brake capacity than available, box 722 may limit the brake systems 616, 622 to only applying the amount of braking force available to the corresponding systems.

In one aspect of this disclosure, the display 84 may indicate when either of the braking systems 616, 622 are implementing the braking command of box 718. Similarly, the display 84 may also identify the available braking capacity from box 722 as well. While a display is specifically illustrated and described herein, other indicators are also considered. More specifically, instead of using visual identifier on a display, this disclosure contemplates using audio indicators as well wherein an audio indication is generated to signify when automatic braking is being implemented and the available brake capacity. Further still, haptic feedback in the seat or controls of the tractor 22 may also be implemented to indicate automatic braking and brake capacity among other things.

While the control system 700 is discussed herein with reference to both brake systems 616, 622 simultaneously, one embodiment of the present disclosure executes a control system for each implement 602, 604 individually. More specifically, a first control system may utilize the sensors 620, 624 of the second implement 604 to determine when the second implement 604 is approaching an unstable condition relative to the first implement 602 and apply the braking system 622 accordingly. Similarly, a second control system could monitor the sensor assemblies 614, 618 of the first implement 602 to determine when the first implement 602 is approaching an unstable condition relative to the tractor 22 and apply the braking system 616 accordingly. In this example, each implement 602, 604 may execute an independent control system.

Similarly, while a first and second implement are discussed herein, there could be only one implement that utilizes the teachings of this disclosure. The sole implement could have a single braking system and sensors similar to the first implement 602 but not have a second implement coupled thereto. In this configuration, the conditions of the first implement would be monitored to identify any unstable conditions and automatically provide braking commands in view thereof.

While the control system 700 is described herein as executing the boxes of FIG. 7, any known controller or processor may implement the teachings discussed herein. Accordingly, when referring to the control system 700 for executing a box or step, this disclosure contemplates one or more controller having a processor capable of executing the step described for the control system 700. Further still, while the boxes are shown and described sequentially, this disclosure also considers executing all of the boxes substantially simultaneously. Further still, the frequency with which the control system 700 executes the boxes described herein may be any appropriate frequency that is sufficiently fast to identify potentially unstable conditions and apply braking systems 616, 622 accordingly.

Figure 8:
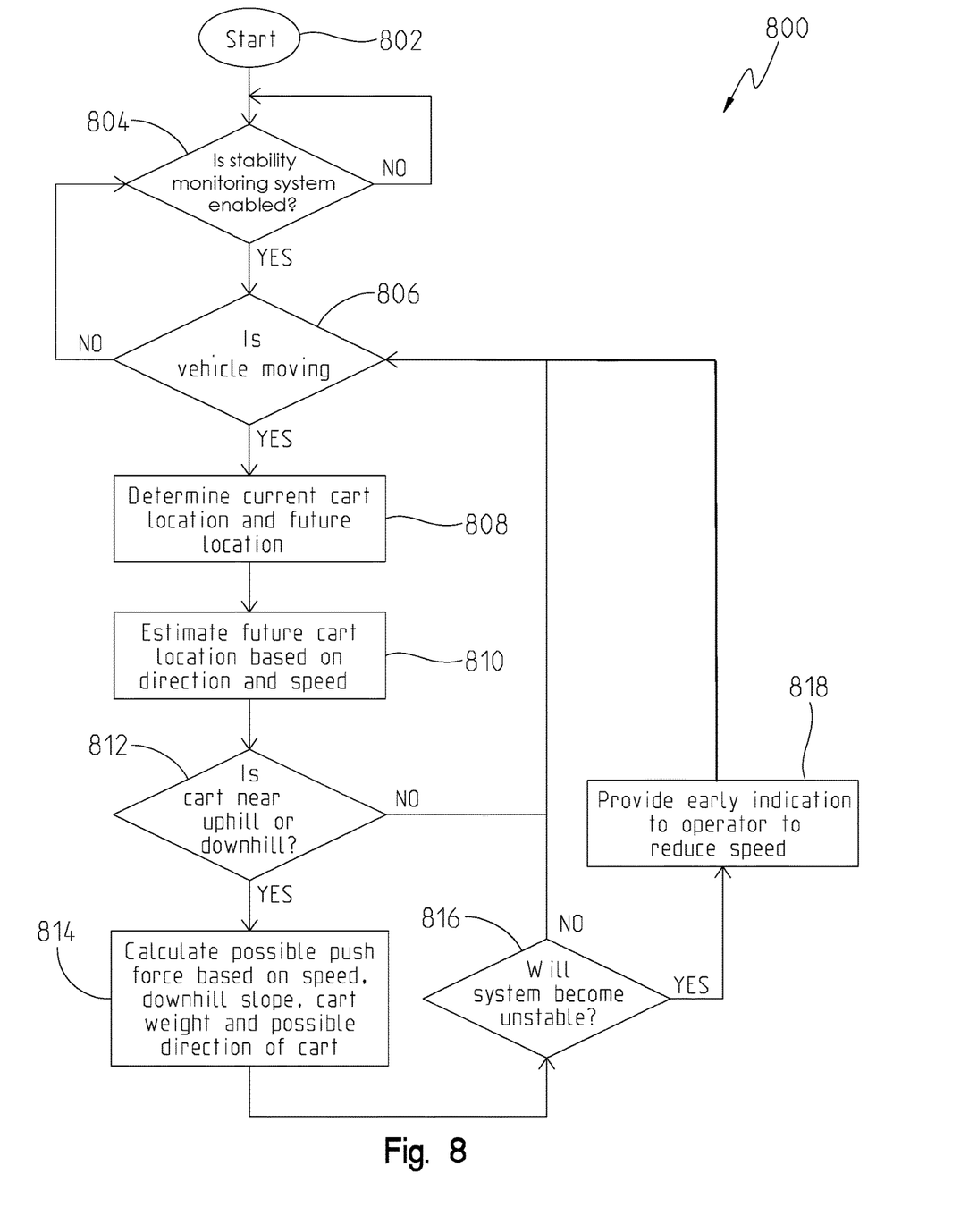
FIG. 8 is a logic flow chart of another embodiment of this disclosure.

Referring now to FIG. 8, another example of a control system 800 is illustrated. The control system 800 may be stored in a memory unit of a controller such as the controller 610. Alternatively, the control system 800 may be stored on the memory unit or units of any other controller or controllers of the assembly 600. In one aspect of this disclosure the control system 800 is stored on a remote controller and communicated to the assembly 600 using known wireless communication protocols. Regardless, the control system 800 may be executed by the any controller of the assembly 600 or otherwise.

The control system 800 may initially start at box 802. Box 802 may be an initial indication that vehicle assembly 600 is in an "on" or moving condition. In one example, the start box 802 may be initiated when the ignition of the tractor 22 is in an "on" position. In this configuration, the controller 610 may identify that the tractor 22 is in a run state and that one or more implement is coupled thereto. In another example, the start box 802 may be engaged via a user interface or switch of the tractor 22. In yet another example, one or more of the sensor assemblies 612, 618, 624 may have an accelerometer or the like and the start box 802 may be initiated when movement of the assembly 600 is detected through the sensors.

In box 804 a check may be performed to identify if stability monitoring functionality of the control system 800 is allowed. If allowed, the control system 800 may execute the remaining boxes. However, if stability monitoring is not allowed in box 804, the control system 800 may not execute the stability monitoring functionality and continue to monitor box 804.

The control system 800 may identify whether the stability monitoring function is allowed in box 804 via any type of user interface. In one non-exclusive example, the input device 82 may be selectable by the user to indicate whether stability monitoring is allowed. In another example, the touchscreen user interface may have a selectable icon indicating stability monitoring is allowed. In yet another embodiment, the stability monitoring of box 804 may always be allowed and box 804 may be substantially skipped as part of the control system 800.

If stability monitoring is allowed in box 804, the control system may execute box 806 wherein the current vehicle speed is compared to a speed threshold. In box 806, the vehicle speed may be determined through the sensor assembly 612 of the tractor 22 or through the sensor assembly 618, 624 of the implements 602, 604. Alternatively, the vehicle speed may be determined via a GPS signal from the sensor assembly 612 or a GPS sensor on any of the implements 602, 604. Further still, the controller may refer to other vehicle systems of the tractor 22 to identify the vehicle speed. The current vehicle speed may be the speed at which the assembly 600 is travelling relative to the underlying surface. Accordingly, in one example the speed threshold of box 806 may be about zero miles per hour wherein when the current speed is greater than zero miles per hour the control logic 800 considers box 808. However, if the current vehicle speed is not greater than the speed threshold in box 806 than the control system 800 may return to box 816 and continue to monitor boxes 804, 806.

Box 806 of the control system 800 may be utilizing vehicle speed values to determine whether stability monitoring should be implemented. More specifically, the control system 800 may utilize box 806 to ensure the assembly 600 is moving before implementing the stability monitoring procedure of the remaining boxes. Further, while the speed threshold is discussed herein as being about zero miles per hour, other speed thresholds are considered herein as well. More specifically, the speed threshold may be a speed greater than zero miles per hour as discussed herein with reference to FIG. 7. Accordingly, many different speed threshold values are contemplated.

If the control system 800 identifies that the current speed is greater than the speed threshold in box 806, the control system 800 may identify the location of the tractor 22 in box

808. The location of the tractor 22 may be identified utilizing a GPS unit of the sensing assembly 612. Further still, the location of the implements 602, 604 may also be determined based on the tractor position 22 utilizing known dimensions of the tractor 22 and implements 602, 604 (such as tongue 52, 606 length) along with vehicle travel direction and speed. In another embodiment, one or more of the implements 602, 604 may have a GPS as part of the corresponding sensor assembly 618, 624 that directly identifies the position of the corresponding implement 602, 604. In yet another embodiment, the location of the assembly 600 may be determined with reference to one or more base station to thereby identify the position of the assembly 600 relative to the base station. Regardless of the method used, in box 808 the control system 800 identifies or calculates the location of one or more of the components of the assembly 600.

Next in box 810, the control system 800 may estimate a future cart location based on the current cart location identified in box 808 and vehicle speed and direction values. The vehicle speed may be determined as discussed herein utilizing vehicle speed sensors or the like from the tractor 22. Alternatively, vehicle speed may be calculated utilizing historic GPS location data. Additionally, any known vehicle speed sensor may be used to identify the speed of the assembly 600, including speed sensors on one or more of the implements 602, 604. The vehicle speed data may be analyzed with reference to the travel direction of the assembly 600 to estimate future cart location in box 810. More specifically, the historic GPS location data may be analyzed by the control system 700 to determine the direction of travel of the assembly 600. Once the direction of travel is determined, the vehicle speed may be considered to estimate the future location of the assembly 600.

The future location of box 810 may be based on any amount of time. For example, in one aspect of this disclosure the future location identified in box 810 is an estimated location of the assembly after a set amount of time based on the current location data of box 808. More specifically, the future location identified in box 810 can be an estimate of the location of the assembly 600 if it continues to travel at the speed and direction previously identified for a set amount of time. In one non-exclusive example, the set amount of time may be about three seconds. In another example, the set amount of time may be less than three seconds. In yet another example, the set amount of time may be more than three seconds.

The control system 800 may assume the assembly 600 is going to continue along the direction of travel as part of the estimation in box 810. Alternatively, the control system 800 may assume the assembly 600 is going to continue to travel along an arc-shaped path if GPS location data shows the assembly 600 is in a turn or the like. Accordingly, the estimation box 810 may assume a linear direction of travel or maintain an arc-shaped path of travel based on the historic GPS location data.

In box 812, the control system 800 may identify whether the assembly 600 is near an uphill or downhill grade change. In one aspect of this disclosure, the control system 800 may compare the current and estimated location data to a topographical map stored in the control system 800 or elsewhere. More specifically, the control system 812 may correlate GPS location data to GPS locations on the topographical map. Further, the control system 800 may identify the elevation change between the current cart location of box 808 and the future cart location of box 810. If the future cart location has a positive elevation change an uphill condition may be identified by the control system 800. If the future cart location has a negative elevation change a downhill condition may be identified by the control system 800.

In one aspect of this example, the control system 800 may compare an estimated elevation change to an elevation change threshold. If the elevation change is less than the elevation change threshold, the control system 800 may determine that there is not a substantial uphill or downhill condition in the estimated future location. In this situation, the control system 800 may return to box 806 and continue monitoring the assembly 600 as discussed herein.

However, if the estimated elevation change is greater than the elevation change threshold, the control system 800 may execute box 814. In box 814, the control system 800 may estimate a potential push force that will be applied to the tractor 22 if the tractor 22 continues to the estimated future location of box 810. In box 814, the control system 800 may assume the assembly 600 is going to maintain vehicle speed and estimate the possible push force based on the measured vehicle speed and the estimated uphill or downhill condition.

In one aspect of this disclosure, the control system 800 may also have one or more load sensor on the sensor assemblies 618, 624 of the first and second implement 602, 604. The load sensors may identify the weight of any commodity or the like of the corresponding implement 602, 604. For example, if the second implement 604 is a commodity cart, a load sensor may be positioned to identify the weight of commodity in the tanks 30, 32, 34, 36.

As part of the determination in box 814, the control system 800 may calculate an estimated push force based on the estimated uphill or downhill orientation of the assembly 600 along with the load of the implements 602, 604. In other words, the measured load of the implements may be considered in box 814 to further identify the push or pull force that may be applied to the tractor 22. When the measured load is low, the push force applied to the tractor in a downhill condition may be less than when the measured load is high for example. As discussed herein with reference to FIG. 7, the force applied to the tractor 22 may be a push or pull force applied through the tongue 52. In the downhill condition, a push force may be experienced when the trailing implements 602, 604 are pulled by gravity towards the tractor 22 down the hill. In an uphill condition, a pull force may be experienced when the trailing implements 602, 604 are pulled by gravity away from the tractor 22 down the hill.

In box 814, the control system 800 may utilize stored algorithms, lookup tables, graphs, or the like to calculate the possible push force that will be experienced by the assembly in the future cart location identified in box 810. For example, the control system 800 may utilize the estimated elevation change to determine the expected push or pull force to be applied by the implements 602, 604 based on known, measured, or estimated weights of the implements 602, 604 along with other known factors such as the rolling resistance of the implements 602, 604 and the orientation of any ground engaging tools among other things.

Once the control system 800 has calculated an estimated force in box 814, the control system 800 may determine whether that estimated force will cause an unstable condition in box 816. For example, if the estimated force from box 814 is a push force that is likely to push the tractor 22, the control system 800 will identify an unstable condition in box 816 and execute box 818. However, if the estimated force is a mild pull force acting on the tractor 22, the control system 800 will identify that the assembly 600 will remain stable and return to box 806 to monitor the control system 800 for changes.

In box 818, the control system 800 may respond to the upcoming unstable condition identified in box 816 by providing an indication to the user that an estimated unstable condition has been identified. In one aspect of this disclosure, the indication in box 818 may be shown on the display 84. The indication in box 818 may include a warning for the operator to reduce speed. Alternatively, the indication may be an auditory signal indicating there is an upcoming unstable condition. Further still, the indication may be haptic feedback applied to the user through a seat or the controls to indicate the user about the upcoming unstable condition.

In another aspect of this disclosure, the control system 800 may check whether automatic braking functionality is enabled in box 818. More specifically, the control system may check if automatic braking is enabled as described for box 704 as part of box 818. If automatic braking is enabled, part of box 818 may include applying, or preparing to apply, the brake system as described in boxes 718, 720, and 722. More specifically, in addition to providing an indication, box 818 may also prepare the braking system to automatically apply the brakes as required by the upcoming condition.

While the control system 800 is described herein as executing the boxes of FIG. 8, any known controller or processor may implement the teachings of this disclosure. Accordingly, when referring to the control system 800 for executing a box or step, this disclosure contemplates one or more controller having a processor capable of executing the step described for the control system 800. In one example, the controller implementing the control system 800 may be the controller 610 of the tractor 22. Further still, one or more of the braking systems 616, 622 may have a controller that partially or wholly executes the control system 800 discussed herein along with, or instead of, the controller 610. Further still, a remote controller may be in communication with the assembly 600 to implement the teachings discussed herein.

In function, the control system 800 may utilize location data from one or more GPS along with assembly speed to predict when the assembly 600 is approaching an unstable condition such as a steep downhill or the like. Once the control system identifies an upcoming potentially unstable condition, the user will be notified via one or more indications that the assembly is approaching an obstacle that may cause an unstable condition.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An agricultural train assembly having a tractor and at least one implement coupled to the tractor through a tongue, comprising:
a tractor braking system that selectively applies tractor brakes;
an implement braking system that selectively applies implement brakes;
a controller that selectively applies the implement braking system;
a sensor that communicates with the controller to identify a push force applied to the tongue, the push force being the amount of force applied by the at least one implement towards the tractor;
wherein, the controller communicates with the sensor to identify the push force and compares the push force to a push threshold;
further wherein, when the push force is greater than the push threshold, the controller instructs the implement braking system to apply a burst braking procedure, the burst braking procedure varying a burst brake frequency based on the push force and at least one condition of the at least one implement.

2. The agricultural train assembly of claim 1, further wherein the sensor is a strain gauge on the tongue and the push force is determined by monitoring the strain gauge values with the controller.

3. The agricultural train assembly of claim 1, further wherein the sensor is at least one of an accelerometer, gyroscope, or load sensor and the controller calculates the push force based on the values of the sensor.

4. An agricultural assembly having a tractor and at least one implement, comprising:
a sensor assembly identifying a condition of the at least one implement;
a controller in communication with the sensor assembly to identify a push force exerted on the tractor based on the condition; and
a braking system on the at least one implement;
wherein, the controller implements a braking procedure when the push force is greater than a push force threshold;
wherein the controller selectively alters a burst frequency of the braking system to alter the variable braking force.

5. The agricultural assembly of claim 4, further wherein the tractor has a tractor brake assembly and the braking procedure does not engage the tractor brake.

6. The agricultural assembly of claim 4, further wherein the braking procedure includes identifying a current brake capacity of the braking system wherein if the current brake capacity is above a brake capacity threshold the braking procedure is ended.

7. The agricultural vehicle of claim 4, further wherein the sensor assembly has a load cell and the condition is a load applied to a tongue of the agricultural assembly.

8. The agricultural vehicle of claim 4, further wherein the sensor assembly has an accelerometer and the condition is a change in acceleration of the implement.

9. The agricultural vehicle of claim 4, further wherein the sensor assembly has a gyroscope and the condition is the orientation of the at least one implement.

10. The agricultural vehicle of claim 4, further wherein the push force is determined by the controller based on a weight and orientation of the implement.

11. The agricultural vehicle of claim 4, further wherein the braking procedure selectively provides a variable braking force to the at least one implement and the controller alters the variable braking force based on the severity of the push force.

12. The agricultural vehicle of claim 4, further comprising a user interface that sends an alert when the braking procedure is being implemented.

13. The agricultural vehicle of claim 4, further wherein an input is selectable to identify when the braking procedure is authorized, wherein if the braking procedure has not been authorized through the input the braking procedure is ended.

14. The agricultural vehicle of claim 13, further comprising a user interface in the tractor that provides the input to a user to selectively authorize the braking procedure.

15. The agricultural vehicle of claim 4, further wherein the sensor assembly includes a Global Positioning System (GPS) and the condition is topographical information based on the position identified by the GPS.

16. The agricultural vehicle of claim 15, further wherein the sensor assembly contains a load sensor that identifies the weight of the at least one implement and the push force is calculated based on the orientation and weight of the at least one implement.

17. A method for stabilizing an agricultural train assembly having a tractor pulling at least one implement, comprising:
   providing a controller in communication with at least one sensor and a user interface, the at least one sensor providing global positioning data;
   predicting, with the controller through the at least one sensor, when the agricultural train is approaching an unstable condition based on current values of the at least one sensor and an estimated future location of the agricultural train, the unstable condition being identified when the estimated future location indicates an elevation change outside of an elevation change threshold; and
   automatically implementing a response with the controller when the agricultural train is approaching the unstable condition;
   wherein, the response provides a corrective action before the agricultural train enters the unstable condition.

18. The method of claim 17, further wherein the at least one sensor identifies a push force of the at least one implement towards the tractor and the response includes selectively pulsing a braking system of only the at least one implement.

19. The method of claim 17, further wherein the predicting step includes identifying when the agricultural train will be positioned along a hill, wherein the corrective action includes one or more of displaying a warning of the upcoming condition on the user interface and automatically applying a brake force with a braking system.

* * * * *